US007242280B2

(12) United States Patent
Frederiksen

(10) Patent No.: US 7,242,280 B2
(45) Date of Patent: Jul. 10, 2007

(54) SECURITY SYSTEM FOR PORTABLE ARTICLES

(75) Inventor: Bjarne Frederiksen, Lombard, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 443 days.

(21) Appl. No.: 10/803,397

(22) Filed: Mar. 18, 2004

(65) Prior Publication Data

US 2005/0206521 A1 Sep. 22, 2005

(51) Int. Cl.
*B60R 25/10* (2006.01)

(52) U.S. Cl. ................ 340/426.1; 340/571; 340/568.1; 340/572.8

(58) Field of Classification Search ............. 340/426.1, 340/571, 426.13, 426.2, 426.21, 568.1, 568.2, 340/546, 572.1, 568.3, 572.8, 572.9
See application file for complete search history.

(56) References Cited

U.S. PATENT DOCUMENTS 3,938,124 A 2/1976 Way et al.
4,746,909 A * 5/1988 Israel et al. .............. 340/568.1
4,985,695 A * 1/1991 Wilkinson et al. ....... 340/568.3
5,020,192 A * 6/1991 Gerlach .................... 24/136 R
5,331,306 A 7/1994 Carruthers, II
5,408,213 A 4/1995 Ungarsohn
5,561,417 A * 10/1996 Rothbaum et al. ....... 340/568.2
5,648,757 A 7/1997 Vernace et al.
5,656,996 A 8/1997 Houser
5,676,258 A 10/1997 Leyden et al.
6,177,869 B1 * 1/2001 McDaid ................... 340/568.1
6,236,312 B1 5/2001 Chitsazan et al.
6,243,005 B1 6/2001 Haimovich et al.
6,326,890 B1 12/2001 Costa
6,380,855 B1 4/2002 Ott
6,700,488 B1 * 3/2004 Leyden et al. ........... 340/568.1

* cited by examiner

*Primary Examiner*—Daniel Wu
*Assistant Examiner*—Daniel Previl
(74) *Attorney, Agent, or Firm*—Wood, Phillips, Katz, Clark & Mortimer

(57) ABSTRACT

The combination of a portable article, a first support, and at least one connecting element for maintaining the portable article in a secured state relative to the first support. The at least one connecting element has at least one arm which overlies a portion of the portable article. At least a portion of the at least one connecting element at least one of a) is made from a hardened metal material, b) has a stepped configuration, and c) has a shaped non-flat surface so as to be resistant to bending in a manner to allow the portable article to be released from the secured state.

39 Claims, 7 Drawing Sheets

SECURITY SYSTEM FOR PORTABLE ARTICLES

BACKGROUND OF THE INVENTION

1. Field of the Invention

This invention relates to security systems and, more particularly, to a security system for maintaining portable articles in a secured state relative to a support therefor.

2. Background Art

Securing of portable articles, such as electronic devices, remains a formidable task for those displaying the same at point of purchase. Electronic devices, such as cellular telephones and personal digital assist devices (PDA's), are becoming increasingly sophisticated while their size diminishes. PDA's, which initially functioned as simple organizers, now have, among other features, the ability to take photographs, function as personal computers, etc. As the sophistication of these devices increases, so do both their cost and the interest of would-be thieves. Given the multitude of different features that are offered with such devices, and their cost, consumers demand the ability to do a "hands on" evaluation. It is impractical for employees to remove, one by one, potentially a large number of devices for inspection by each customer. First of all, given the high volume of such devices, the labor force required in each operation would be economically impractical. Second, unrestrained devices are inviting to thieves. An employee may not be able to keep track of all devices that have been made available to potential customers at a particular display.

This has led to the display of portable electronic devices, such as cellular telephones and PDA's, in a manner so that each model remains on display. This necessitates some sort of security system to prevent unauthorized removal of the devices from the display area. Myriad display systems are currently available to purveyors of electronic devices, ranging from simple mechanical systems to sophisticated electronic systems. The assignee herein currently offers a complete line of such systems.

One mechanical system utilizes a flexible cable. One end of the cable is connected to a support, with the other connected to a device that is to be secured. The potential consumer is allowed the freedom to pick up, operate, and relocate the device within a range permitted by the length of the cable. Generally, this type of system is defeatable by severance of the cable, or separation of the cable from the device and/or support.

Electronic systems generally utilize a cable that establishes a conductive path between a particular device and a support. A cable end connector is attachable to each device and is normally placed in an armed state as an incident of the attachment. In the event that the end connector is removed or the cable is severed, a detectable signal is caused to be generated which alerts those monitoring the system that there has been a breach.

While electronic systems are highly effective, they have two inherent drawbacks. First of all, those using the same must contend with the problem of wire management. This problem may be significant at displays at which a large number of devices are being secured. Secondly, these systems are generally more expensive than their mechanical counterparts. In high volume operations, the cost of installing systems of this type must be weighed against anticipated losses due to theft resulting from a) the absence of any securing system, or b) the use of a less expensive, mechanical system.

Recently, the assignee herein introduced a mechanical system which captively engages individual devices that are to be displayed. This application is co-pending herewith as Ser. No. 10/235,412 entitled "Security System for a Portable Device". The system utilizes a frame, which may be made from cast or formed metal, and adjustable connecting elements which cooperatively embrace an article that is secured. Other variations of this system include individual connecting elements which are independently mounted to a support, such as a wall, to captively hold a device relative thereto.

The designs in the prior paragraph, while generally effective, have the drawback that the frames/connecting elements are prone to being defeated by a reconfiguration thereof by a would-be thief at the display. In one form, one of the connecting elements has a generally "L" shape, with transverse legs. One leg is suitably secured to a support, with the other bearing against a surface of the device to captively hold the device in an operative state. By bending one or both of the legs of the "L", the system might be defeated.

The industry continues to seek out viable systems for improving security for portable devices which are both effective and affordable, taking into consideration the anticipated losses in the absence of the use of such systems.

SUMMARY OF THE INVENTION

In one form, the invention is directed to the combination of a portable article, a first support, and at least one connecting element for maintaining the portable article in a secured state relative to the first support. The at least one connecting element has at least one arm which overlies a portion of the portable article. At least a portion of the at least one connecting element at least one of a) is made from a hardened metal material, b) has a stepped configuration, and c) has a shaped non-flat surface so as to be resistant to bending in a manner to allow the portable article to be released from the secured state.

In one form, with the portable article in the secured state, the portable article is captive between a part of the at least one connecting element and the first support.

In one form, the part of the at least one connecting element is defined by the at least one arm.

In one form, the at least one connecting element has a base which is connected to the first support. The at least one arm projects from the base and has a first leg and a second leg projecting transversely to the first leg. The portable article is captive between the second leg and the first support.

The first support may be integral with a connecting element.

In one form, at least a part of the first support is formed as one piece with the connecting element.

The combination may further include a second support and a connecting system joined between the first and second supports.

In one form, the connecting system includes a flexible cable/cord.

The combination may further include an alarm system capable of producing a detectable signal as an incident of at least one of a) the flexible cable/cord being severed, b) the flexible cable/cord being separated from the first support and c) the flexible cable/cord being separated from the second support.

In one form, the portion of the at least one connecting element has a rib formed therein defining the stepped configuration.

The portion of the at least one connecting element may have an "L" shape.

In one form, the portion of the at least one connecting element defines the at least one arm.

The connecting element and first support may have facing surfaces between which the portable article is captive.

The combination may further include a second connecting element that is separate from the one connecting element. The second connecting element has a second arm that overlies a portion of the portable article and cooperates with the one connecting element to maintain the portable article in the secured state.

In one form, the at least one connecting element is selectively securable to the first support in a plurality of different positions.

In one form, the at least one connecting element has an adjusting state and a fixed state relative to the first support. In the adjusting state, the at least one connecting element is maintained against separation from the first support and selectively repositionable relative to the first support.

In one form, the at least one connecting element has a base from which the at least one arm projects and the base is connected to the first support.

In one form, a fastener extends into the first support and maintains the at least one connecting element on the first support.

In one form, the first support has a wall with oppositely facing front and rear surfaces. The fastener extends through the front surface so that a part of the fastener is exposed beyond the rear surface. A securing element is attached to the exposed part of the fastener to prevent separation of the at least one connecting element from the first support.

The exposed part of the fastener may be threaded.

In one form, the wall has a plurality of discrete openings through which the fastener can be selectively extended.

The invention is further directed to a connecting element for securing a portable article. The connecting element has a base and an arm projecting from the base. The base is one of a) connected to and b) connectable to a first support. The arm has a first leg and a second leg disposed transversely to the first leg. The arm is configured to captively overlie a portion of the portable article that is being secured. At least a portion of the at least one connecting element at least one of a) is made from a hardened metal material, b) has a stepped configuration, and c) has a shaped, non-flat surface so as to be resistant to bending.

The first support may be integral with the base.

In one form, the first support is formed as one piece with the base.

The base and first support may have facing surfaces between which a portable article being secured can be captively maintained.

The connecting element may have an integral fastener thereon.

In one form, the fastener has a threaded element.

In one form, the connecting element has a rib formed thereon defining the stepped configuration.

DETAILED DESCRIPTION OF THE DRAWINGS

Figure 1:
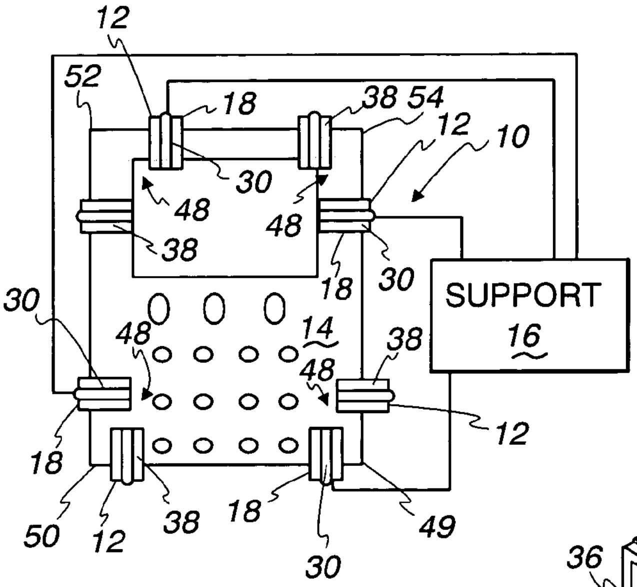
FIG. 1 is a partially schematic, front elevation view of a security system, according to the present invention, shown maintaining a portable article, in the form of a PDA, in a secured state relative to a support, and including a plurality of cooperating connecting elements.
Figure 2:
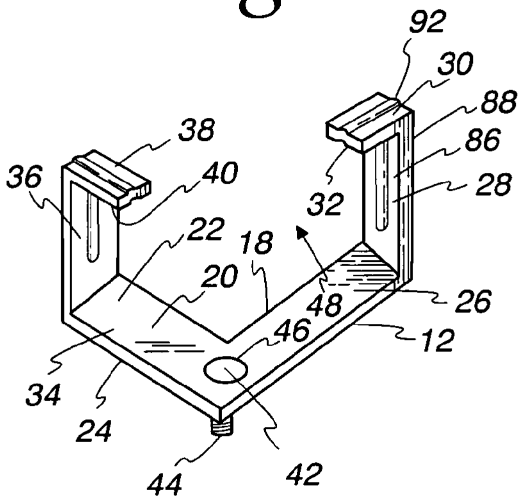
FIG. 2 is an enlarged, perspective view of one of the connecting elements on the security system in FIG. 1.
Figure 3:
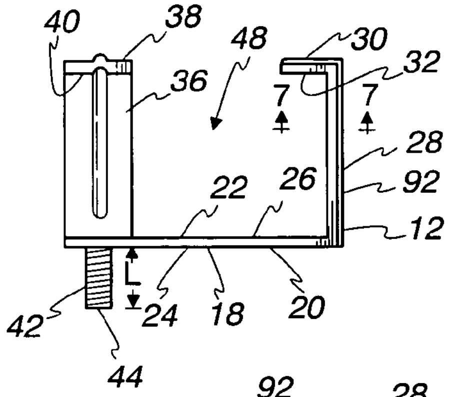
FIG. 3 is an enlarged, elevation view of the connecting element in FIG. 2, from one side thereof.
Figure 4:
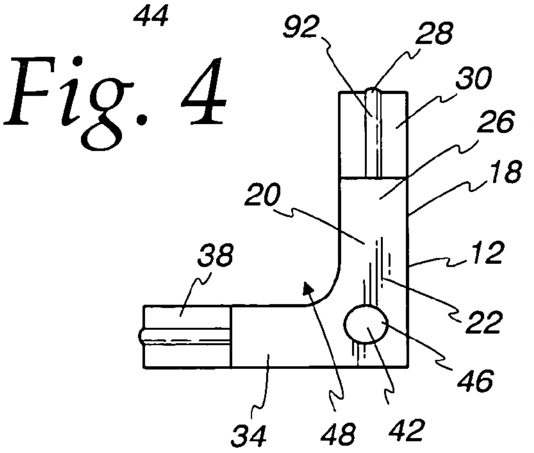
FIG. 4 is an enlarged, plan view of the connecting element in FIGS. 2 and 3.
Figure 5:
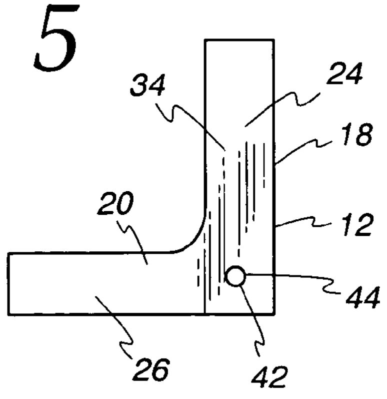
FIG. 5 is an enlarged, bottom view of the connecting element in FIGS. 2–4.

One form of security system, according to the present invention, is shown at 10 in FIGS. 1–7. The security system 10 consists of a plurality of, and in this case four, connecting elements 12, each of like construction, and useable to cooperatively maintain a portable article 14 in a secured state relative to a support 16. The portable article 14 is shown in the form of a personal digital assist device (PDA). The description relative to the portable article 14 as a PDA is intended to be illustrative only. The inventive concept can be practiced with virtually any type of portable article, be it electronic or otherwise.

Each connecting element 12 has a body 18 consisting of an L-shaped base 20 with first and second oppositely facing, flat surfaces 22, 24. One leg 26 of the "L" has an elongate arm 28 thereon which projects substantially orthogonally to the plane of the surface 22. The arm 28 has a main portion/leg with a return bend/leg 30 which defines a generally flat surface 32 that is parallel to, and faces, the surface 22 on the base 20. The base 20 has a second leg 34 from which an arm 36, similar to the arm 28, projects. The arm 36 has a return bend 38 defining a generally flat surface 40 that is substantially parallel to, and faces, the surface 22.

A fastener 42 is provided on the base 20 at the juncture of the legs 26, 34 and has a cantilevered threaded portion 44. In this embodiment, the fastener 42 is fixed to the base 20 and has an enlarged head 46 which can be secured by any suitable means to the body 18 to fix the rotation of the fastener 42 on the connecting element 12. The fastener 42 could be made separable from, and/or rotatable relative to, the base 20.

Each connecting element 12, configured as described above, defines a receptacle at 48 within which a corner 49, 50, 52, 54 of the portable article 14 can nest. By nesting each corner 49, 50, 52, 54 of the portable article 14, one each in a receptacle 48 on the connecting elements 12, and thereafter securing the connecting elements 12 to the support 16, the portable article 14 is precluded from being separated from the connecting elements 12 and the support 16.

Figure 6:
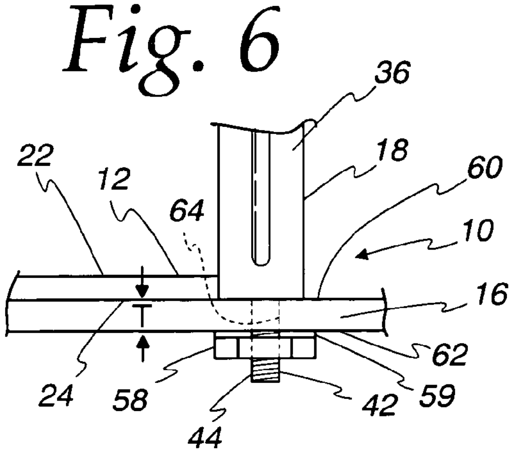
FIG. 6 is an enlarged, fragmentary, elevation view showing the connection between the connecting element in FIGS. 2–5 and the support shown in FIG. 1.
Figure 7:
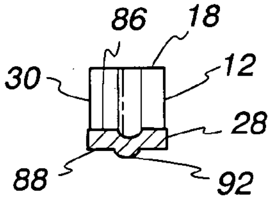
FIG. 7 is a cross-sectional view of an arm on the connecting element taken along line 7—7 of FIG. 3.

As shown in FIG. 6, each of the connecting elements 12 can be maintained upon the support 16 by directing the threaded part 44 of the fastener 42 through the support 16 to expose the threaded part 44 so that a suitable connector, such as a threaded nut 58, can be attached and tightened. A locking washer 59 can be used to avoid tampering with this connection.

Figure 8:
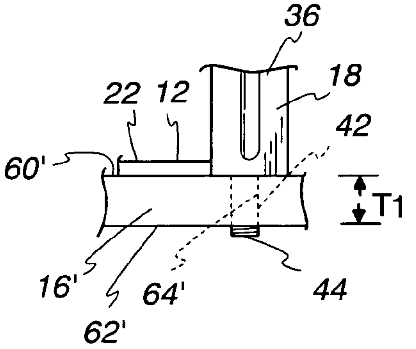
FIG. 8 is a view as in FIG. 6 of a modified form of connection between the connecting element and support.

Alternatively, as shown in FIG. 8, the support 16' could have a bore 64' that is threaded to mate with the threaded part 44 of the fastener 42.

The support 16, shown in FIG. 6, has a wall with a front surface 60 and a rear surface 62 between which a thickness T is defined. The thickness T is less than the length L (FIG. 3) of the fastener 42 so that the threaded part 44, upon being directed from front to rear through a bore 64, 64' in the support 16, is exposed sufficiently to accept the nut 58.

In FIG. 8, the thickness T1 of the support 16' is greater than the thickness T to allow the fastener 42 to be threaded thereinto. It is not necessary for the threaded part 44 of the fastener 42 to extend through the front surface 60' to beyond the rear surface 62' so as to accept a nut 58.

Figure 9:
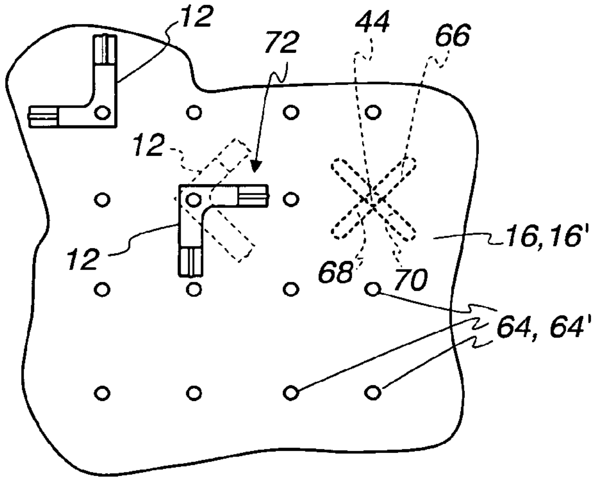
FIG. 9 is a fragmentary, front elevation view of one form of support, as shown in FIG. 1, and having a plurality of connecting elements shown thereon.

The support 16, 16' can take a variety of different forms. As shown in FIG. 9, the support 16, 16' may be formed as a wall to which the connecting elements 12 can be fixed in different manners to maintain the portable article 14, and other types of portable articles, in a secured state at different locations on the support 16, 16'. As depicted, the support 16, 16' has an array of bores 64, 64' through which the threaded parts 44 on the fasteners 42 can be directed, by translation in the case of the latter, and by rotation in the case of the former.

As an alternative to, or in conjunction with, the bores 64, 64', slots 66 (one shown in phantom lines in FIG. 9) can be provided through the support 16, 16'. In this particular embodiment, the slot 66 has crossing slot portions 68, 70. Each slot 66 is capable of accepting the threaded part 44 of each fastener 42 in such a manner that the threaded part 44 can translate within the slot portions 68, 70 to change the location of each connecting element 12 relative to the support 16, 16'. The same slot configuration shown at 66 can be utilized at selected locations, or each location, where there is a bore 64, 64' in FIG. 9. Other slot configurations, having virtually any shape, i.e. straight, V-shaped, etc., are contemplated.

The individual setting up the security system 10 has the option of preassembling the connecting elements 12 to the portable article 14 and thereafter directing the threaded parts 44 of the fasteners 42 one each into a bore 64, 64' or slot 66, and thereafter tightening the nuts 58 to place the connecting elements 12 in a fixed state relative to the support 16, 16'. Alternatively, the connecting elements 12 can be loosely connected in an adjusting state whereby they are pivotable about the length of the threaded parts 44 of the fasteners 42 and/or translatable within the slots 66, but maintained against separation from the support 16, 16' by the nuts 58. The connecting elements 12 can then be selectively repositioned to be strategically located to engage a portable article 14 placed at the support 16, 16'. Thereafter, nuts 58 can be tightened onto the threaded parts 44 of the fasteners 42.

The use of the arrangement shown in FIG. 8 is practical only for connecting one or more of the connecting elements 12 at each mounting location since changing of the connecting elements 12 from their adjusting state into the fixed state utilizing this arrangement requires rotation of the connecting elements 12. On the other hand, with the arrangement shown in FIG. 6, the connecting elements 12 in the adjusting state can be selectively repositioned, as seen for example in the two different positions shown in solid and phantom line at the location at 72 for one of the connecting elements 12 in FIG. 9, and maintained in a desired orientation as the nuts 58 are tightened.

In short, by strategically placing bores 64, 64' and/or slots 66 in the configuration shown, or using other configurations, different cooperative arrangements of the connecting elements 12 can be established to maintain different sizes and shapes of portable articles 14 in the secured state on the support 16, 16'.

With the above described arrangement, the portable article 14 is effectively captured between the surfaces 32, 40 on the connecting elements 12 and the support 16. In actuality, with the portable article 14 in the secured state, the portable article 14 is captive between the surfaces 32, 40 and the bases 20, which function as a separate support to which the portable article 14 may directly abut.

In a preferred form, the base/support 20 and arms 28, 36 are integrally formed and, more preferably, are formed as one piece, as from metal that may be cast or bent. As hereinafter described, the connecting elements 12 are constructed so as to avoid deformation, as by bending of the arms 28, 36 in a manner to allow the associated portable article 14 to be released from the secured state.

Figure 10:
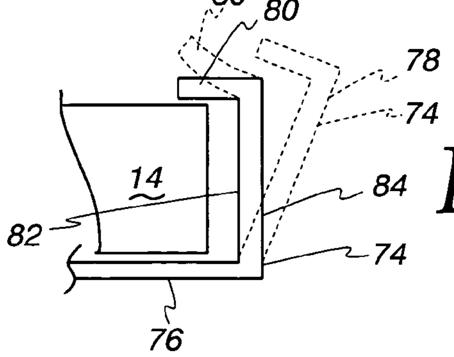
FIG. 10 is a fragmentary, elevation view showing the connection between a conventional connecting element and a portable article, as in FIG. 1, with the connecting element reconfigured in phantom lines to show possible ways to breach the system.

One problem that is addressed by the present invention is depicted with respect to the prior art connecting element shown at 74 in FIG. 10. The exemplary prior art connecting element 74 has a base 76, a transverse arm 78, and a return bend 80. In FIG. 10, in solid lines, the portable article 14 is shown captively embraced between the base 76 and returned bend 80. The system can be defeated, and the portable article 14 released from the secured state, by either bending the return bend 80, as shown in phantom lines in FIG. 10, and/or by bending the entire arm 78 relative to the base 76, as also shown in phantom lines in FIG. 10. Typically, the arms 78 are made from flat stock having oppositely facing, flat, substantially parallel surfaces 82, 84. This flat material, made from a thickness that is typically used in this environment, may be deformed by a would-be thief quickly and without excessive effort to defeat the system. The connecting elements 74 are conventionally made from available metal materials without any special treatment thereof.

According to the invention, the connecting elements 12 are reinforced against bending, as described with respect to FIG. 10, as might permit the portable article 14 to be released from the secured state. The invention contemplates a number of different ways of accomplishing this end. These may be used singly or in combination to enhance the performance of the inventive system 10.

First of all, the metal, defining at least that portion of the connecting elements 12 prone to being bent, is treated to be hardened. A suitable steel may be sheet stainless steel, such as 410 #2D stainless steel, having a thickness on the order of 0.062 inches. Other materials and thicknesses are contemplated, with these parameters being only exemplary in nature. By hardening the portions of the connecting elements 12, the connecting elements 12 can be made sufficiently resistant to tampering that any attempt to effect bending of the arms 28, 36 is likely to be aborted.

To add another level of rigidity, the otherwise flat, parallel, oppositely facing surfaces 86, 88 of the exemplary arm 28 can be shaped so that at least one of the surfaces 86, 88 is non-flat over at least part of its areal extent. In the embodiment shown in FIGS. 1–8, a rib 92 is formed continuously along the majority of the length of the main portion of the arm 28 and return bend 30 to produce the shape shown most clearly in cross section in FIG. 7. The surface 88 is changed from a flat shape to have a shaped, non-flat, stepped surface configuration. The non-flat configuration depicted improves the rigidity of the arm 38 to make it resistant to bending as might defeat the security system 10, as demonstrated in FIG. 10. The arm 36 is made in similar fashion.

By hardening at least a portion of the connecting element 12 prone to bending, and/or reshaping the material in the arms 28, 36, the connecting element 12 can be made highly resistant to tampering. As noted above, by using these features in combination, potentially greater resistance to tampering is incorporated. Using one of the features by itself may improve the resistance to bending of the arms 28, 36 sufficiently to frustrate those otherwise attempting to separate the portable article 14 from its secured state.

Figure 11:
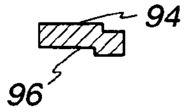
PRIOR ART Fig. 11
FIG. 11 is a cross-sectional view of a modified form of arm on the inventive connecting element.

Other arm configurations consistent with the invention are shown in FIGS. 11–16 on legs corresponding to either of the legs 26, 34. In FIG. 11 oppositely facing surfaces 94, 96 are shown to each have a stepped configuration.

Figure 12:
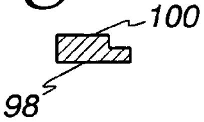
FIG. 12 is a view as in FIG. 11 of another form of arm.

In FIG. 12, one of the surfaces 98 is flat, with the oppositely facing surface stepped.

Figure 13:
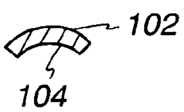
FIG. 13 is a view as in FIGS. 11 and 12 of another form of arm.

In FIG. 13, the entire arm structure is shaped so that oppositely facing surfaces 102, 104 are arcuate and open in the same direction.

Figure 14:
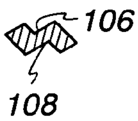
FIG. 14 is a view as in FIGS. 11–13 of a further form of arm.

FIG. 14 shows an arm with oppositely facing surfaces 106, 108, each with a stepped configuration different than that shown in FIG. 11.

Figure 15:
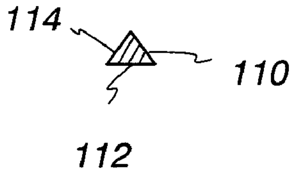
FIG. 15 is a view as in FIGS. 11–14 of a still further form of arm.

In FIG. 15, an arm shape is shown to be generally triangular in cross section with three flat surfaces 110, 112, 114, with one of the flat surfaces 112 situated to overlie the surface on the portable article 14 in the secured state.

Figure 16:
FIG. 16 is a view as in FIGS. 11–15 of yet a still further form of arm.

In FIG. 16, an arm configuration is shown with a rounded outer surface 116.

The arm configurations heretofore described are intended to be exemplary in nature only. Other variations are contemplated, with those most desirable being those having other than two oppositely facing, continuously flat surfaces which may be prone to bending. Hardening of the materials used to define each of the configurations in FIGS. 1–16 is contemplated.

Figure 17:
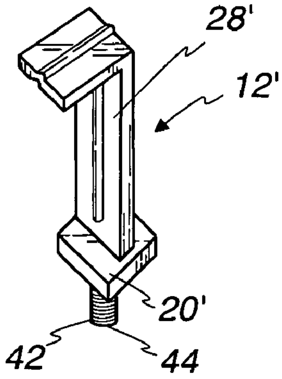
FIG. 17 is a perspective view of a modified form of connecting element, according to the present invention.

Further, the configuration of the connecting element 12 shown is intended only to be exemplary. Any of virtually a limitless number of different configurations for the connecting element 12 could be utilized consistently with the invention. As just one example, in its simplest form, a connecting element is shown in FIG. 17 at 12' and consists of a single arm 28' attached to a base 20'. The arm 28' has the same overall configuration as the arm 28 previously described. A fastener 42 with a threaded part 44 projects from the base 20'. This particular connecting element 12' can be strategically placed at different locations to secure the portable article 14. The connecting element 12' can be hardened and has the cross-sectional shape as previously described for the arm 28. While the connecting element 12' has a simplified form, this form is not preferred in that the system might be defeated by simply pivoting the connecting element 12' about the length of the fastener to allow the portable article 14 held thereby to be released from the secured state.

Figure 18:
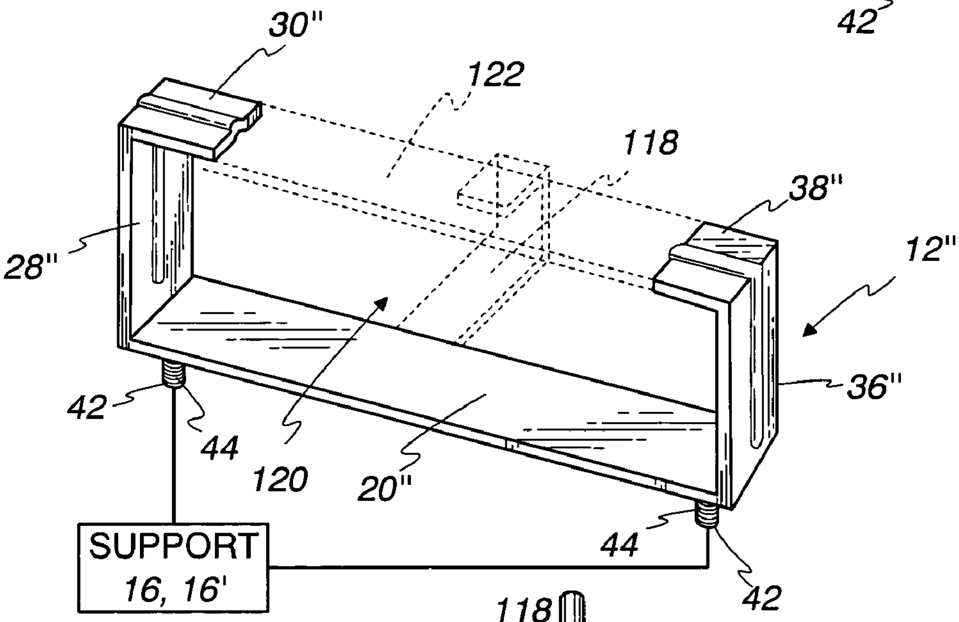
FIG. 18 is a perspective view of a further modified form of connecting element, according to the present invention.

A further modified form of connecting element is shown at 12" in FIG. 18. In this embodiment, a base 20" has a generally straight shape with arms 28", 36" at its ends corresponding in shape and function to the arms 28, 36, respectively. Like fasteners 42 with threaded portions 44 are used to secure the connecting element 12" relative to a support 16, 16'.

Alternatively, a separate arm 118, projecting generally orthogonally to the length of the base 20", can be formed as one piece with the remainder of the connecting element 12", or separately attached thereto as to become an integral structure therewith. With this arrangement, the arms 28", 36", 118 cooperatively define a receptacle 120 for a portion of a portable article.

As a potential further modification, as shown in dotted lines in FIG. 18, an optional bridging portion 122 may connect between the returned bends 30", 38" to produce a continuous shape around the receptacle 120.

Figure 19:
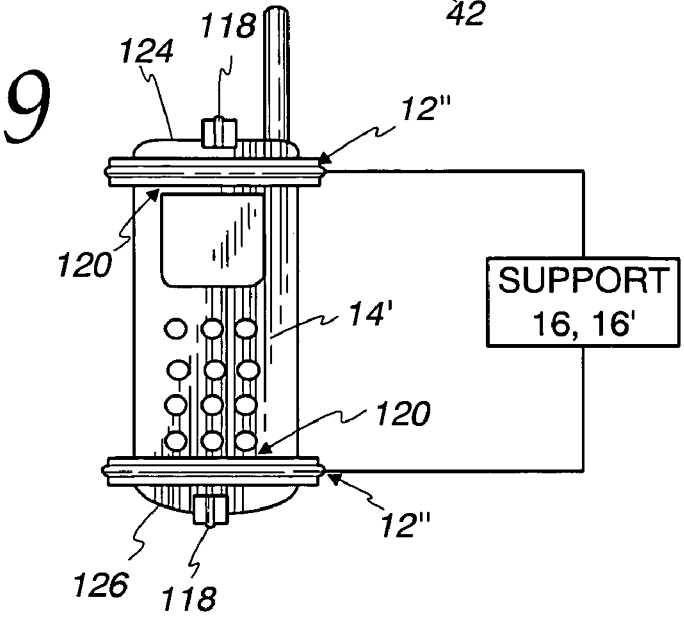
FIG. 19 is a view as in FIG. 1 of a modified form of security system with a portable article that is a cellular telephone.

The basic configuration, shown in solid lines in FIG. 18 with the arm 118 and bridging portion 122, is shown operatively connected to maintain a portable article 14' in a secured state, in FIG. 19. In this particular embodiment, the portable article 14' is in the form of a cellular telephone and has a top end 124 which projects into the receptacle 120 on one of the connecting elements 12" and a bottom end 126 that projects into the receptacle 120 defined by the other connecting element 12". By securing the connecting elements 12" to a suitable support 16, 16', the portable article 14' is captively held in the secured state shown.

Figure 20:
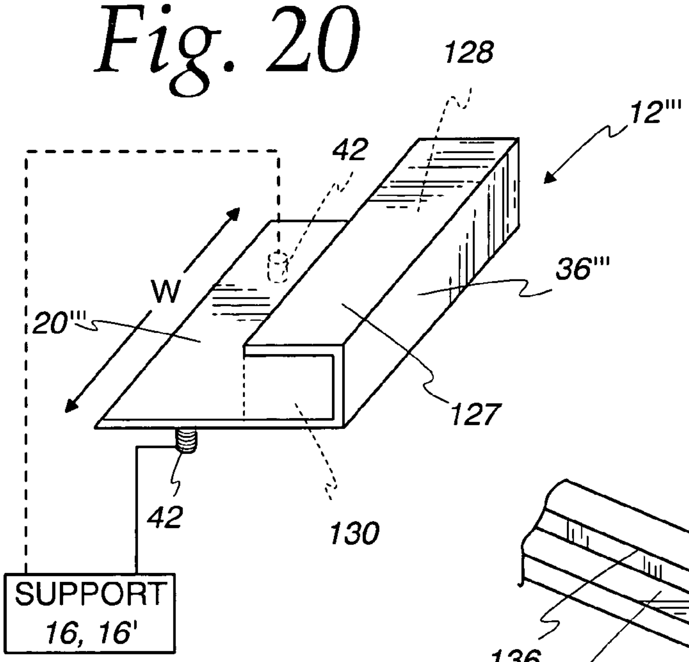
FIG. 20 is a perspective view of a still further form of connecting element, according to the present invention.

In FIG. 20, a further modified form of connecting element is shown at 12'". The connecting element 12'" has a base/support 20'" and an integrally formed arm 36'" which is formed with a return bend 127 to define a receptacle 128 for a portable article 14, 14'. Fasteners 42 are utilized to maintain the connecting element 12'" on a suitable support 16, 16'. The connecting element 12''' differs from the connecting element 12' previously described primarily by reason of the greater width W of the connecting element 12'''. An optional stop wall 130 can be incorporated to close a part of the receptacle 128 and to abut to a portion of a portable article 14, 14' within the receptacle 128.

Figure 21:
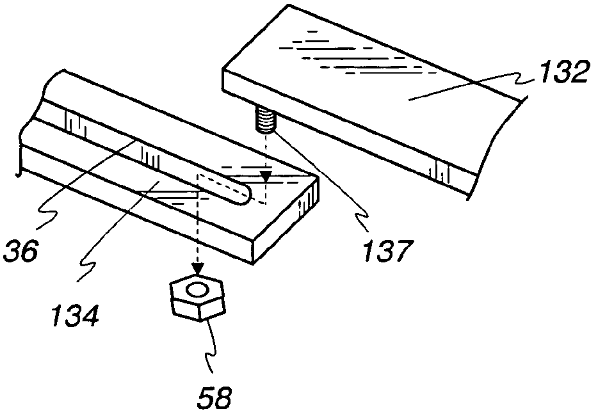
FIG. 21 is a fragmentary, perspective view of joinable portions which may be used to define variable lengths for an elongate part of one of the inventive connecting elements.

As shown in FIG. 21, the invention contemplates the ability to adjust the length of either of the arms 28, 36, or the base 20, by forming the same from relatively repositionable and securable parts 132, 134. Through this arrangement, the effective length of the combined element produced by the parts 132, 134 can be adjusted and fixed. More specifically, the part 134 has an elongate slot 136 through which a fastener 137 can be directed and engaged with a nut 58. With the desired effective length established and the fastener 42 within the slot 136, the nut 58 can be tightened to fix the relative positions of the parts 132, 134. As noted above, this length adjusting capability may be incorporated into any part of the connecting elements 12, 12', 12" to increase the range of dimensions of portable articles that can be accommodated and to make each connecting element 12, 12', 12" more versatile in nature.

Figure 22:
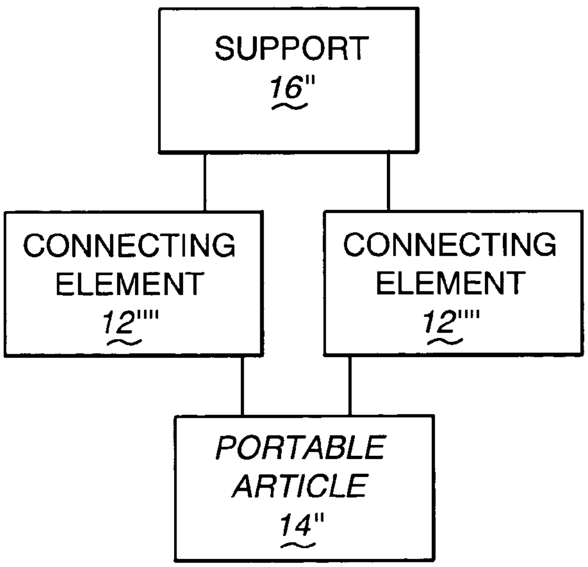
FIG. 22 is a schematic representation of one form of security system, according to the present invention.
Figure 23:
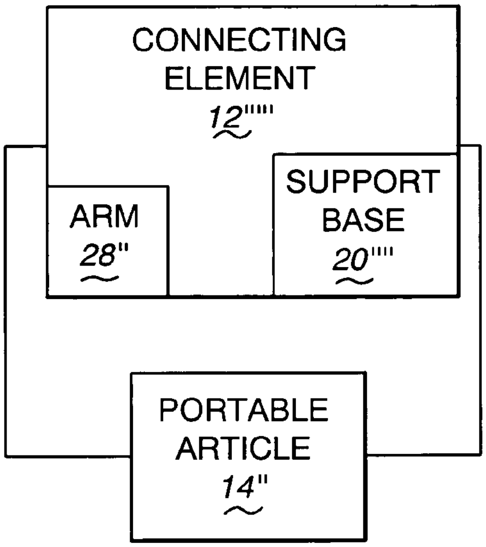
FIG. 23 is a view as in FIG. 22 of another form of security system, according to the present invention.

As noted above, while the invention has been described with respect to two particular portable articles 14, 14', the invention has a more generic application, as shown in FIGS. 22 and 23. In FIG. 22, the portable article is shown generically at 14", to be virtually any type of electronic or non-electronic component which is maintained relative to a support 16" utilizing connecting elements 12"". The support 16" can be virtually any structure relative to which the portable article 14" is to be connected. The connecting elements 12"" can be made in the form shown, and may take any of a virtually limitless number of different forms, ranging from a single arm 28', as shown in FIG. 17, to a number exceeding the two shown in the embodiment in FIGS. 2 and 18.

In still another form, as shown in FIG. 23, the portable article 14" is associated with a connecting element 12''''' having an arm 28" as a part thereof and also a support/base 20"" which functions as the aforementioned base/support 20.

In still another form, as shown in FIGS. 25–30, the exemplary, aforementioned connecting elements 12, each having a base/support 20, are associated with a support assembly 138, consisting of joinable support parts 140, 142, with the latter serving as a cover and the former as a support. In this embodiment, the connecting elements 12 and support assembly 138 are used to secure a portable article in the form of a flip-type cellular telephone 14".

The support part 140 is in the form of a flat body 144 having four elongate slots 146, 148, 150, 152 therethrough, one each associated with each corner 154, 156, 158, 160, respectively, of the body 144. The slots 146, 148, 150, if extended in a lengthwise direction, would cooperatively form an “X” shape. The width W2 (FIG. 27) is common to all of the slots 146, 148, 150, 152 and is large enough to accommodate the diameter of the threaded part 44 of the fastener 42 on each connecting element 12. The slots 146, 148, 150, 152 are configured to allow the connecting elements 12 to pivot and translate therewithin to accommodate different sizes and shapes for the portable article 14".

Figure 24:
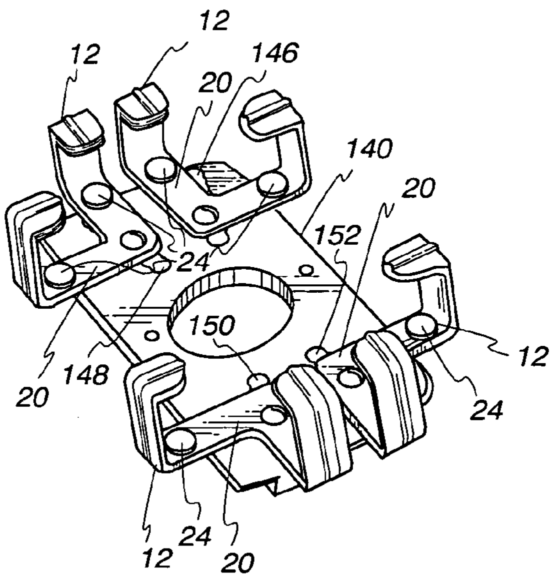
FIG. 24 is a perspective view of a subassembly including connecting elements in FIGS. 1–7 connected to one part of a two part support assembly, according to the present invention.
Figure 25:
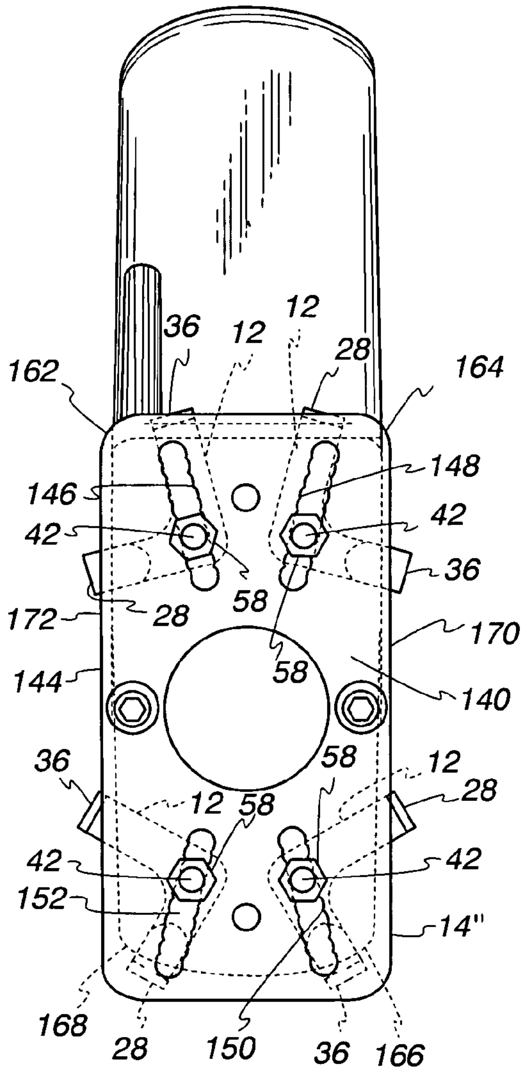
FIG. 25 is a rear elevation view of the subassembly in FIG. 24 connected to a portable object that is another form of cellular telephone.

As seen in FIGS. 24 and 25, the connecting elements 12 can each be placed in the adjusting state wherein they are loosely maintained against separation from the support part 140 by the nuts 58 so as to be repositionable relative to the support part 140. By then directing the corners 162, 164, 166, 168 of the portable article 14", one each into a receptacle 48 associated with the adjacent connecting element 12, the portable article 14" can be loosely confined by the cooperating connecting elements 12. Thereafter, the connecting elements 12 are repositioned to bring each of the arms 28, 36 on each connecting element 12 into direct contact with transverse portions of the peripheral edge 170 of a housing 172 for the portable article 14". The nuts 58 can then be tightened to place the connecting elements 12 in their fixed state.

To prevent access to the nuts 58, the support part/cover 142 is secured to the support part 140. The support part 142 has bent edge portions 174, 176, 178, 180, which define in conjunction with a main, flat, body portion 182, a receptacle 184 of sufficient depth to accommodate the projecting threaded parts 44 of the fasteners 42. The edge portions 174, 176, 178, 180 can be abutted directly to the flat surface 186 on the support part 140. A pair of threaded fasteners 188 (one shown) can be directed through the support part 142 and into nuts 190 fixed on the support part 140. With this arrangement, the support part 142 effectively shields the nut 58 against access as might allow loosening of the connecting elements 12. The fasteners 188 may be made with a tamper-proof head 192 so that they cannot be removed in the absence of a special tool.

Figure 26:
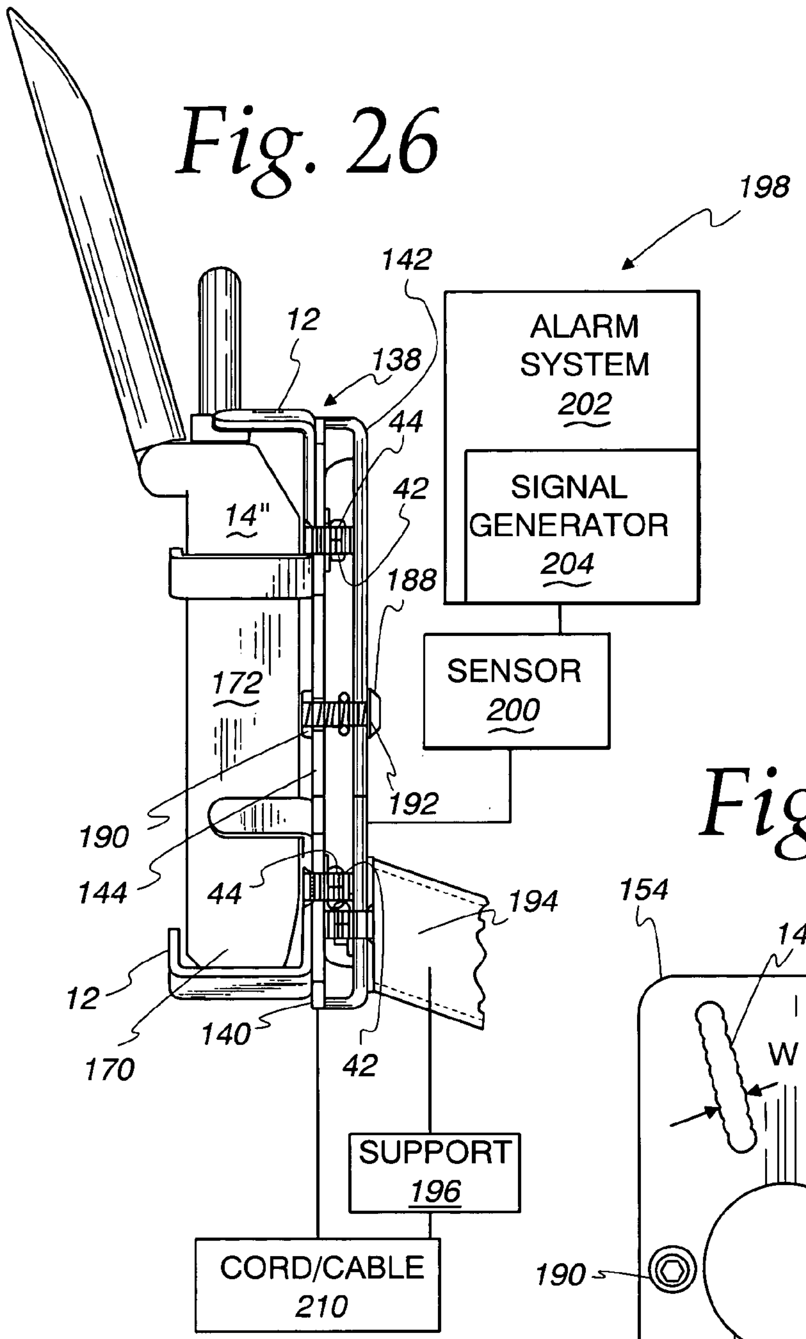
FIG. 26 is a side elevation view of the combined cellular telephone and subassembly in FIG. 24 and joined to a separate cover part that makes up the support assembly.
Figure 27:
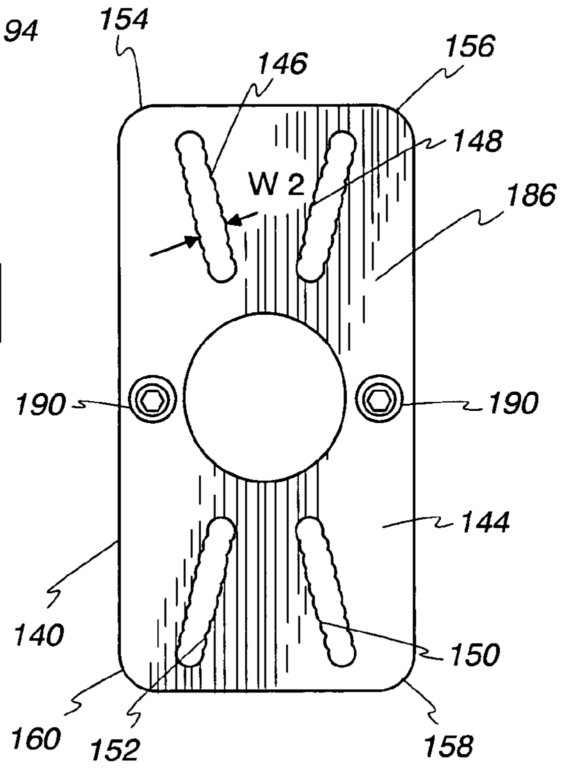
FIG. 27 is a rear elevation view of the support assembly part shown in FIGS. 24 and 25.
Figure 28:
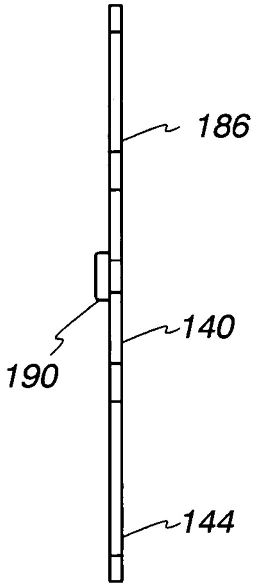
FIG. 28 is a side elevation view of the support assembly part in FIGS. 24, 25 and 27.
Figure 29:
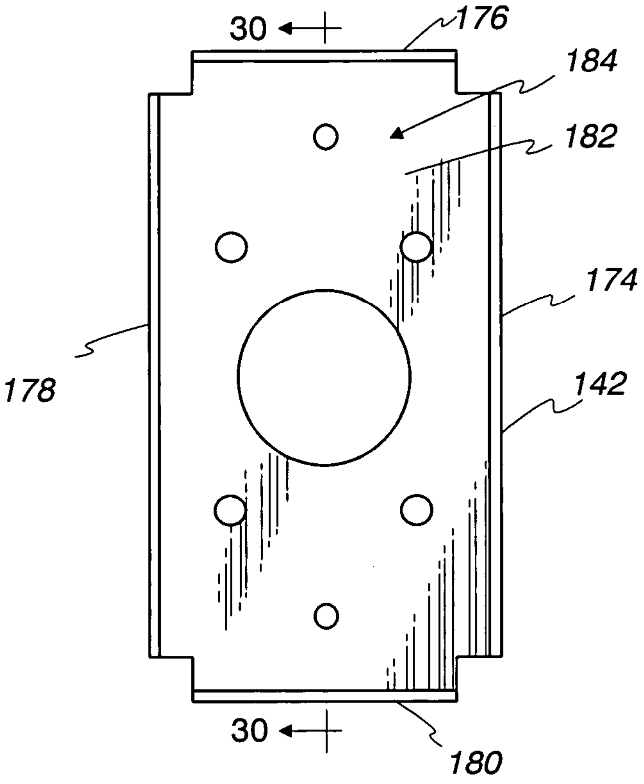
FIG. 29 is a front elevation view of the cover part on the support assembly shown in FIG. 26.
Figure 30:
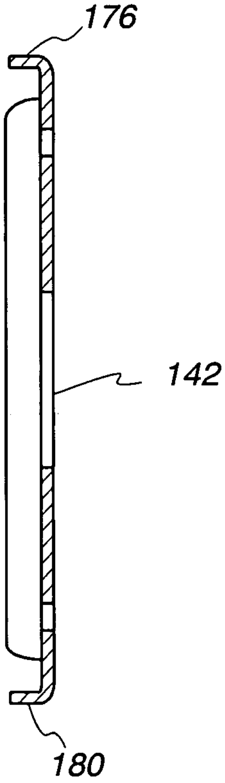
FIG. 30 is a cross-sectional view of the cover part taken along line 30—30 of FIG. 29.

As seen in FIG. 26, a mounting tube 194 may be fixedly attached to the support part 142 and is mountable to a separate support 196, as at a point of purchase display. The tube 194 may be removably or permanently attached to the support 196. In the event that the tube 194 is separable from the support 196, or in the event that the tube 194 is absent, the associated support assembly 138 is allowed to be repositioned. A security system may be incorporated as shown at 198 in FIG. 26. The security system 198 includes a sensor 200 that is attached to the support assembly 138 in known manner. The sensor 200 may be electrically connected to an alarm system 202 having a detectable signal generator 204. A suitable system is shown, for example, in assignee’s U.S. Pat. No. 5,552,771, incorporated herein by reference. If the sensor 200 is removed, or a conductive path between the sensor and the alarm system 202 is interrupted by a would-be thief, the signal generator 204 produces a signal that may be audibly and/or visually detected.

Alternatively a cord/cable 210 can be used to connect the support part 140 to the support 196. The cord/cable 210 may be, for example, a purely mechanical structure.

As a further alternative, the cord/cable 210 can be attached to one or more of the connecting elements 12.

Protective pads 212 (FIG. 24) can be provided on the connecting elements 12 to protect the portable articles 14, 14', 14" against damage and to potentially stabilize the mounting of the same.

The foregoing disclosure of specific embodiments is intended to be illustrative of the broad concepts comprehended by the invention.

The invention claimed is:

1. In combination:

a portable article;

a first support; and at least one connecting element for maintaining the portable article in a secured state relative to the first support, the at least one connecting element comprising at least one arm with a main portion and a return bend that overlies a portion of the portable article, at least a second portion of the at least one connecting element at least one of a) is made from a hardened metal material, b) has a stepped configuration, and c)

has a shaped non-flat surface so as to thereby be resistant to bending in a manner to allow the portable article to be released from the secured state, the second portion of the at least one connecting element comprising at least one piece of substantially flat metal stock that is formed to define the at least one connecting element, the portable article captive between the first support and return bend.

2. The combination according to claim 1 wherein with the portable article in the secured state the portable article is captive between a part of the at least one connecting element and the first support.

3. The combination according to claim 2 wherein the part of the at least one connecting element is defined by the at least one arm.

4. The combination according to claim 1 wherein the at least one connecting element comprises a base which is connected to the first support and the at least one arm projects from the base and has a first leg and a second leg projecting transversely to the first leg and the portable article is captive between the second leg and the first support.

5. The combination according to claim 1 wherein the first support is integral with the connecting element.

6. The combination according to claim 5 wherein at least a part of the first support is formed as one piece with the connecting element.

7. The combination according to claim 6 further comprising a second support and a connecting system joined between the first and second supports.

8. The combination according to claim 7 wherein the connecting system comprises a flexible cable/cord.

9. The combination according to claim 8 further comprising an alarm system that produces a detectable signal as an incident of at least one of a) the flexible cable/cord being severed, b) the flexible cable/cord being separated from the first support and c) the flexible cable/cord being separated from the second support.

10. The combination according to claim 5 wherein the connecting element and first support have facing surfaces between which the portable article is captive.

11. The combination according to claim 1 wherein the second portion of the at least one connecting element has a length along which the arm and return bend are formed and a rib extends along the length of the at least one connecting element to define the stepped configuration.

12. The combination according to claim 11 wherein the second portion of the at least one connecting element has an "L" shape.

13. The combination according to claim 12 wherein the second portion of the at least one connecting element defines the at least one arm.

14. The combination according to claim 12 wherein the rib is defined on the return bend.

15. The combination according to claim 12 wherein the rib extends continuously between the return bend and main body.

16. The combination according to claim 1 further comprising a second connecting element that is separate from the one connecting element, the second connecting element comprising a second arm that overlies a portion of the portable article and cooperates with the one connecting element to maintain the portable article in the secured state.

17. The combination according to claim 1 wherein the at least one connecting element is selectively securable to the first support in a plurality of different positions.

18. The combination according to claim 1 wherein the at least one connecting element has an adjusting state and a fixed state relative to the first support, the at least one connecting element in the adjusting state maintained against separation from the first support and selectively repositionable relative to the first support.

19. The combination according to claim 1 wherein the at least one connecting element comprises a base from which the at least one arm projects and the base is connected to the first support.

20. The combination according to claim 19 wherein a fastener extends into the first support and maintains the at least one connecting element on the first support.

21. The combination according to claim 20 wherein the first support comprises a wall with oppositely facing front and rear surfaces, the fastener extends through the front surface so that a part of the fastener is exposed beyond the rear surface and a securing element is attached to the exposed part of the fastener to prevent separation of the at least one connecting element from the first support.

22. The combination according to claim 21 wherein the exposed part of the fastener is threaded.

23. The combination according to claim 21 wherein the wall has a plurality of discrete openings through which the fastener is selectively extended.

24. The combination according to claim 1 wherein the second portion of the at least one connecting element has a length along which the main portion and return bend are formed, the portable article captive between the first support and the return bend, and the second portion of the at least one connecting element has a non-flat shape over at least a part of the length of the portion of the at least one connecting element.

25. The combination according to claim 24 wherein the non-flat shape is provided on the return bend.

26. The combination according to claim 24 wherein the arm has a main portion extending away from the support to the return bend and the non-flat shape extends along the length of the main portion.

27. The combination according to claim 24 wherein the non-flat shape is curved.

28. A connecting element for securing a portable article, the connecting element comprising:

a base that is one of a) connected to and b) connectable to a first support; and an arm having a first leg projecting from the base and a second leg disposed transversely to the first leg, the arm having a length along which the first and second legs are formed, the arm configured to so that the second lea captively overlies a portion of a portable article that is being secured, at least a portion of the at least one connecting element comprising a substantially flat metal material that at least one of a) is hardened, b) has a stepped configuration, and c) has a shaped, non-flat surface so as to thereby be resistant to bending transversely to the length of the arm.

29. The connecting element for securing a portable article according to claim 28 wherein the first support is integral with the base.

30. The connecting element for securing a portable article according to claim 29 wherein the arm and first support have facing surfaces between which a portable article being secured can be captively maintained.

31. The connecting element for securing a portable article according to claim 28 wherein the first support is formed as one piece with the base.

32. The connecting element for securing a portable article according to claim 28 wherein the connecting element has an integral fastener thereon.

33. The connecting element for securing a portable article according to claim 32 wherein the fastener comprises a threaded element.

34. The connecting element for securing a portable article according to claim 28 wherein the connecting element has a length along which the first and second legs are defined and the portion of the connecting element has a rib formed thereon extending along the length of the connecting element and defining the stepped configuration.

35. The combination according to claim 28 wherein the rib is formed on the first leg.

36. The combination according to claim 28 wherein the rib extends continuously between the first and second legs.

37. The combination according to claim 28 wherein the portion of the at least one connecting elevator has a non-flat shape over at least a part of the length of the connecting element.

38. The combination according to claim 37 wherein the non-flat shape is provided on the second leg.

39. The combination according to claim 37 wherein the non-flat shape is provided on the first leg.

* * * * *